United States Patent
Friedrich et al.

(10) Patent No.: US 11,706,292 B1
(45) Date of Patent: Jul. 18, 2023

(54) LOCAL PREFERENCE IN ANYCAST CDN ROUTING

(71) Applicant: Disney Enterprises, Inc., Burbank, CA (US)

(72) Inventors: Eric C. Friedrich, North Easton, MA (US); Robert G. Colantuoni, Hanahan, SC (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/695,581

(22) Filed: Mar. 15, 2022

(51) Int. Cl.
*H04L 67/1036* (2022.01)
*H04L 67/02* (2022.01)
*H04L 67/101* (2022.01)
*H04L 61/4511* (2022.01)
*H04L 67/568* (2022.01)
*H04L 67/10* (2022.01)
*H04L 67/1004* (2022.01)
*H04L 67/1021* (2022.01)

(52) U.S. Cl.
CPC ...... *H04L 67/1036* (2013.01); *H04L 61/4511* (2022.05); *H04L 67/02* (2013.01); *H04L 67/10* (2013.01); *H04L 67/101* (2013.01); *H04L 67/1004* (2013.01); *H04L 67/1021* (2013.01); *H04L 67/568* (2022.05)

(58) Field of Classification Search
None
See application file for complete search history.

(56) References Cited

U.S. PATENT DOCUMENTS

| | | | | |
|---|---|---|---|---|
| 8,621,042 | B2 * | 12/2013 | Eggleston | H04L 61/4511 370/254 |
| 9,021,112 | B2 * | 4/2015 | Slocombe | H04L 67/288 709/229 |
| 10,104,039 | B1 * | 10/2018 | Knecht | H04L 61/2592 |
| 10,341,849 | B2 * | 7/2019 | Maslak | H04W 28/20 |
| 10,455,030 | B2 * | 10/2019 | Maslak | H04L 61/4511 |
| 10,735,528 | B1 * | 8/2020 | Shafiullah | H04L 67/75 |
| 11,057,489 | B2 * | 7/2021 | Xie | H04L 67/63 |
| 11,075,987 | B1 * | 7/2021 | Solapurkar | H04L 67/1023 |

(Continued)

OTHER PUBLICATIONS

Ritesh Maheshwari, "TCP over IP Anycast—Pipe dream or Reality?", LinkedIn Engineering, Sep. 9, 2015, 10 pages. <https://engineering.linkedin.com/network-performance/tcp-over-ip-anycast-pipe-dream-or-reality>.

(Continued)

*Primary Examiner* — Lashonda Jacobs-Burton
(74) *Attorney, Agent, or Firm* — Patterson + Sheridan, LLP

(57) ABSTRACT

Embodiments herein describe a CDN where anycast routing is used to identify a load balancer for selecting a cache in the CDN to use to deliver a requested object to a user. In one embodiment, the user performs a DNS lookup to identify an anycast IP address for a plurality of load balancers in the CDN. The user can then initiate anycast routing using the anycast IP address to automatically identify the closest load balancer. Once the identified balancer selects the cache, the load balancer can close the anycast connection with the user device and use an HTTP redirect to provide the user device with a unicast path to the selected cache. The user device can then establish a unicast connection with the cache to retrieve (e.g., stream) the object.

22 Claims, 5 Drawing Sheets

(56) References Cited

U.S. PATENT DOCUMENTS

| | | | |
|---|---|---|---|
| 2002/0016860 A1* | 2/2002 | Garcia-Luna-Aceves | G06F 12/1483 709/214 |
| 2002/0052942 A1* | 5/2002 | Swildens | H04L 67/1008 709/223 |
| 2010/0121945 A1* | 5/2010 | Gerber | H04L 67/1021 709/223 |
| 2011/0040861 A1* | 2/2011 | Van der Merwe | H04L 61/4511 709/245 |
| 2011/0055316 A1* | 3/2011 | Van der Merwe | H04L 1/08 709/245 |
| 2011/0153719 A1* | 6/2011 | Santoro | H04L 67/1008 709/203 |
| 2011/0161461 A1* | 6/2011 | Niven-Jenkins | H04L 61/5038 709/217 |
| 2012/0215915 A1* | 8/2012 | Sakata | H04L 67/1001 709/224 |
| 2014/0108674 A1* | 4/2014 | Eggleston | H04L 61/5069 709/245 |
| 2014/0207818 A1* | 7/2014 | Jellick | G06F 16/24553 707/771 |
| 2014/0258523 A1* | 9/2014 | Kazerani | H04L 43/08 709/224 |
| 2015/0172354 A1* | 6/2015 | Coppola | H04L 65/612 709/203 |
| 2015/0215388 A1* | 7/2015 | Kontothanassis | H04L 67/1008 709/226 |
| 2016/0028600 A1* | 1/2016 | Santoro | H04L 67/1008 709/224 |
| 2017/0126796 A1* | 5/2017 | Hollis | H04L 67/568 |
| 2018/0063705 A1* | 3/2018 | Maslak | H04W 72/29 |
| 2019/0327608 A1* | 10/2019 | Maslak | H04W 8/245 |
| 2020/0053172 A1* | 2/2020 | Maslak | H04L 61/4511 |
| 2020/0389403 A1* | 12/2020 | Buddhikot | H04L 67/1001 |
| 2020/0401687 A1* | 12/2020 | Mak | G06T 19/006 |
| 2021/0160551 A1* | 5/2021 | Hou | H04N 21/812 |

OTHER PUBLICATIONS

Matt Levine, Barrett Lyon, Todd Underwood, "TCP Anycast—Don't believe the FUD Operational experience with TCP and Anycast." presentation, retrieved Mar. 10, 2022, 24 pages, <https://archive.nanog.org/meetings/nanog37/presentations/matt.levine.pdf>.

* cited by examiner

LOCAL PREFERENCE IN ANYCAST CDN ROUTING

BACKGROUND

Content Distribution/Delivery Networks (CDNs) are large, geographically spread networks of caches. These caches deliver video and other web content (referred to generally as "objects") to viewers. Selecting the best cache to use to deliver the object to the user is a difficult task. Most CDNs generally use two techniques to identify the optimal cache to use to deliver the object. First, domain name system (DNS) load balancing can be used to select the optimal cache. Once a DNS server chooses the best cache, the CDN responds to a DNS lookup from the user with the IP address of the cache (or cache cluster). However, DNS load balancing has several challenges. First, the true client IP address (used for geolocation/mapping) is often not visible to the CDN's DNS servers. Instead, the DNS server sees the IP address of the resolver of the internet service provider (ISP) used by the user (or worse a cloud-based public DNS resolver). Without an accurate client IP address, cache localization is more difficult. Additionally, DNS lookups do not contain information about the content being requested. CDNs are therefore unable to use asset level load balancing policies during cache localization. For example, asset level policies may allow for targeting specific caches or clusters that are known to have the content already in cache. Finally, even with a very low time to live (TTL), there is some amount of caching of the load balancer responses. This can be good, in times of high load, but ultimately reduces the ability of the DNS server to identify the location of the user.

A second strategy used to select the cache closest to the user is anycast routing. Anycast allows the same IP address to be advertised by many hosts. At every hop, the layer 3 switch or router determines the lowest cost path for the packet. This localizes clients to the closest logical CDN cache. However, routing changes may cause connections to be interrupted if packets are delivered to different hosts due to the risk of connection resets. Anycast has traditionally been used for User Datagram Protocol (UDP) or extremely short-lived transmission control protocol (TCP) connections.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Embodiments herein describe a CDN where anycast routing is used to identify a load balancer (also referred to as a traffic router) for selecting a cache in the CDN to use to deliver an object to a user. In one embodiment, the user performs a DNS lookup to identify an anycast IP address for a plurality of load balancers in the CDN. The user can then initiate anycast routing using the anycast IP address to automatically identify the closest logical load balancer of the plurality of load balancers that share that anycast IP address. Advantageously, the load balancer will see the IP address of the user device as well as the full path of the object (e.g., a movie, television show, live performance, etc.). This is unlike many types of DNS lookups where the true user IP is hidden behind a resolver making the DNS request and the DNS lookup does not indicate the object being requested. With this information, the load balancer can determine an accurate location of the user device and use one or more load balancing criteria to select an optimal CDN cache.

Once the cache is selected, the load balancer can close the anycast connection with the user device and use an HTTP redirect (e.g., a HTTP response status code 302) to provide the user device with a unicast path to the selected cache. The user device can then establish a unicast connection with the cache to retrieve the object. Advantageously, the anycast connection to the load balancer is often very short (e.g., 100-300 milliseconds), which mitigates the likelihood that a network disturbance (e.g., a cut line, a disconnected router, and the like) will change the anycast route to a different load balancer. Once the load balancing is complete, the user device uses the unicast path provided by the HTTP redirect to retrieve the cache, which is typically a much longer connection (e.g., 5-8 seconds to transfer a segment) and is not susceptible to potential network disturbances introduced by anycast routing. In this manner, the embodiments herein can reap the benefits of anycast routing to automatically identify the closest load balancer which provides more accurate information than a DNS lookup, while using a unicast connection to retrieve the object from the CDN cache which avoids the susceptibility of using an anycast connection to network disturbances.

Figure 1:
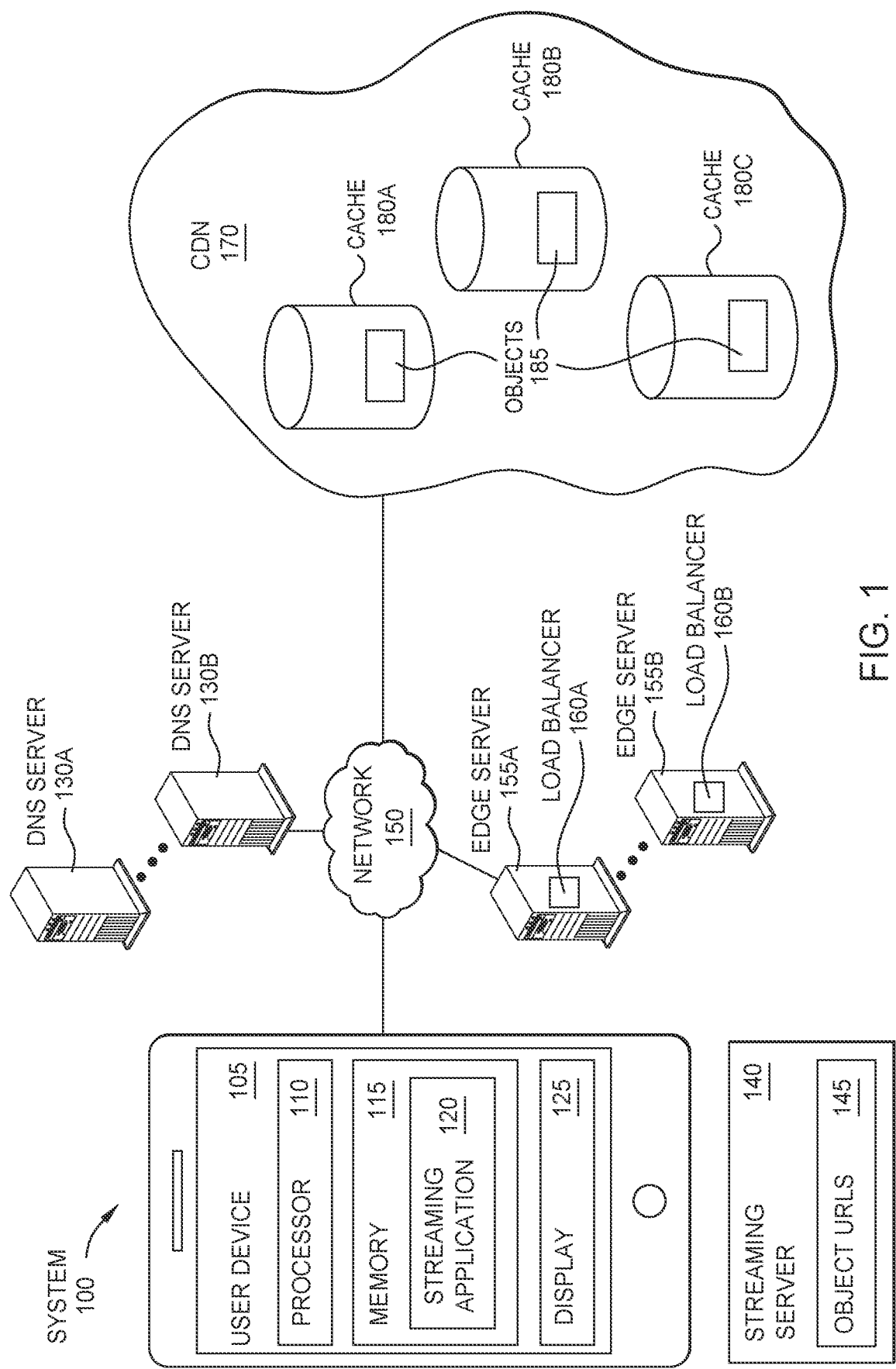
FIG. 1 is a block diagram of a communication system, according to one embodiment.

FIG. 1 is a block diagram of a communication system 100, according to one embodiment. The system 100 includes a user device 105, DNS servers 130, a network 150 (e.g., a public network such as the Internet), edge servers 155, a CDN 170, and a streaming server 190. The user device 105 can be any device which can retrieve objects 185 from caches 180 in the CDN 170. In this embodiment, the user device 105 includes a display 125 so it can display (e.g., output) a media presentation from the CDN 170, such as a smartphone, tablet, laptop, smart television etc. However, in other embodiments, the user device 105 may not include a display and can instead be a streaming player or media player which is coupled to an output device, such as a television.

In any case, the user device 105 includes a processor 110 and memory 115. The processor 110 represents any number of processing elements that can include any number of processing cores. In general, the processor 110 retrieves and executes programming instructions stored in the memory 115. The memory 115 can include volatile memory elements, non-volatile memory elements, and combinations thereof. Specifically, the memory 115 includes a streaming application 120 (e.g., a software application) that can select an object 185 to retrieve from the CDN 170. For example, the streaming application 120 may output a graphical user interface (either using the display 125 or a separate electronic device such as a television) that lists multiple different media presentations such as movies, live events, television episodes, and the like. The user can then use the interface to select a particular media presentation to watch either on the user device 105 or a connected output device.

In response to the user selecting a media presentation, the user device 105 can transmit a request to a streaming server 190 for a uniform resource location (URL) that corresponds to the media presentation. The streaming server 190 can store a different object URL 195 for each object (e.g., media presentation) stored in the CDN 170. The object URLs 195 may include the name of the media presentation such as http:// . . . AdventureShowEpisode1Season2 . . . . In this manner, the URLs 195 in the streaming server 190 provide a URL for accessing the media presentation (or other object) requested by the user.

The user device 105 can then use the object URL 195 to perform a DNS lookup. The DNS lookup converts the object URL 195 to an IP address that can be used in the network 150 to identify a location for retrieving (or streaming) the requested media presentation. In this case, the system 100 includes multiple DNS servers 130, but in other embodiments, may include only one DNS server 130. The user device 105 can use either unicast routing or anycast routing to identify a DNS server 130 to perform the DNS lookup. The advantage of using anycast routing is it can automatically identify the DNS server 130 with the shortest route to the user device 105 through the network 150, thus potentially reducing the time used to perform the DNS lookup. However, the embodiments herein can also use unicast routing to perform the DNS lookup.

The DNS server 130 provides an IP address to the user device 105 in response to the DNS lookup. However, rather than providing the user device with an IP address to a cache 180 for retrieving the object, in some embodiments, the DNS server 130 provides an anycast IP address to the edge servers 155. Or more specifically, the DNS server 130 provides an anycast IP address to reach load balancers 160 (e.g., software applications) hosted in the edge servers 155. In one embodiment, each of the edge servers 155 has the same anycast IP address. Thus, when the DNS server 130 provides the anycast IP address to the user device 105, performing anycast routing with that address automatically identifies the edge server 155 and load balancer 160 with the shortest path to the user device 105. That is, anycast routing uses an underlying routing protocol (such as Border Gateway Protocol (BGP)) to identify the shortest path to one of a plurality of network devices (e.g., the edge servers 155) with the same anycast IP address.

The load balancer 160 in the edge server 155 identified from anycast routing can then use one or more load balancing criteria to determine which cache 180 is optimal to deliver the requested media presentation (e.g., the object 185). The embodiments herein are not limited to any particular load balancing criteria. Non-limiting examples include using the cache 180 that is co-located with (or closest to) the identified edge server 155, ensuring the load on any particular cache 180 does not exceed a threshold, ensuring a minimum amount of requests are sent to each cache 180, routing requests away from a cache 180 that will soon be taken down for maintenance, and the like.

There are several advantages to using a load balancer 160, rather than the DNS server 130, in an edge server 155 to select the cache 180. One advantage is that the TCP communication between the user device 105 and the load balancer 160 has more information than the DNS lookup between the user device 105 and the load balancer 160. For example, the communication to the load balancer 160 can include the full path to the requested object 185 while a DNS lookup does not have this information. Thus, the load balancer 160 knows what object 185 the user is requesting and can select the cache 180 accordingly while this information is hidden from the DNS server. For example, some caches 180 in the CDN 170 may have the requested object while others do not.

Further, the HTTP communications from the user device 105 to the load balancer 160 can contain the true IP address of the user device 105 while the DNS lookup can include the IP address of a resolver (which might not be at, or close to, the geographic location of the user device 105). Thus, any geolocation functions performed by the load balancer 160 when selecting a cache 180 can be more accurate than geolocation functions performed by the DNS server 130.

As mentioned above, the communication between the user device 105 and the load balancer 160 can be an anycast connection which automatically identifies the load balancer 160 that is closest to the user device 105. Also mentioned above, an anycast connection is susceptible to network disturbances that can change the connection. For example, due to a wire being cut or a router being taken down from maintenance, the shortest path may change from, e.g., the load balancer 160A to the load balancer 160B. The process will then have to repeat or reset since the load balancer 160B will not have any of the information that was already provided by the user device 105 to the load balancer 160A. However, the communication between the load balancers 160 and the user device 105 are typically very short (e.g., 200-300 millisecond) with the devices exchanging a single HTTP request/response pair, which can include a TCP handshake, TLK handshake (optional), and the HTTP request/response itself. The load balancer 160 and the user device may exchange between 5-10 TCP segments. Thus, the risk of a network disturbance occurring during the anycast connection between the user device 105 and the load balancer 160 is small.

Once the load balancer 160 selects a cache 180 for the user device 105 to use to retrieve or stream the requested object 185 (e.g., requested media presentation), the load balancer 160 can send an HTTP redirect to the user device 105 (e.g., an HTTP response with a status code of 302) that redirects the user device 105 to the selected cache 180. Stated differently, the load balancer 160 closes the anycast connection and redirects the user device 105 to a cache 180. The HTTP redirect can include a unicast path to the selected cache 180 so that the user device 105 can establish a unicast connection to the cache 180 in response to the HTTP redirect. While an HTTP redirect using the 302 status code is described, the embodiments are not limited to such but can use any present or future redirect HTTP mechanism such as the 301 status code or Alt-Svc.

Because the connection between the user device 105 and the cache 180 is typically much longer in order to retrieve the object 185 than the connection between the user device 105 and the load balancer 160, using a unicast connection between the user device 105 and the cache 180 avoids the susceptibility of an anycast connection. That is, if a network disturbance occurs along the unicast path between the user device 105 and the cache 180, the user device 105 will still connect to the same cache 180, albeit using a different route or path through the network 150. Thus, using an anycast connection between the user device 105 and the load balancer 160 enables the system 100 to automatically identify the load balancer 160 closest to the user device 105 more accurately than relying on the DNS server 130 to perform geolocation. Further, using an HTTP redirect to close or terminate the anycast connection with the load balancer 160 and establish a unicast connection to the selected cache 180 can avoid the risk of using a long anycast connection to retrieve or stream the object 185.

While FIG. 1 illustrates that only the caches 180 are in the CDN 170, in other embodiments, the DNS servers 130 and the edge servers 155 along with the load balancers 160 can be considered as part of the CDN 170.

Further, the streaming server 190, the DNS servers 130, the edge servers 155, and the caches 180 can include one or more processors, memory, software applications, input/output interfaces, and the like to perform the functions recited herein.

Figure 2:
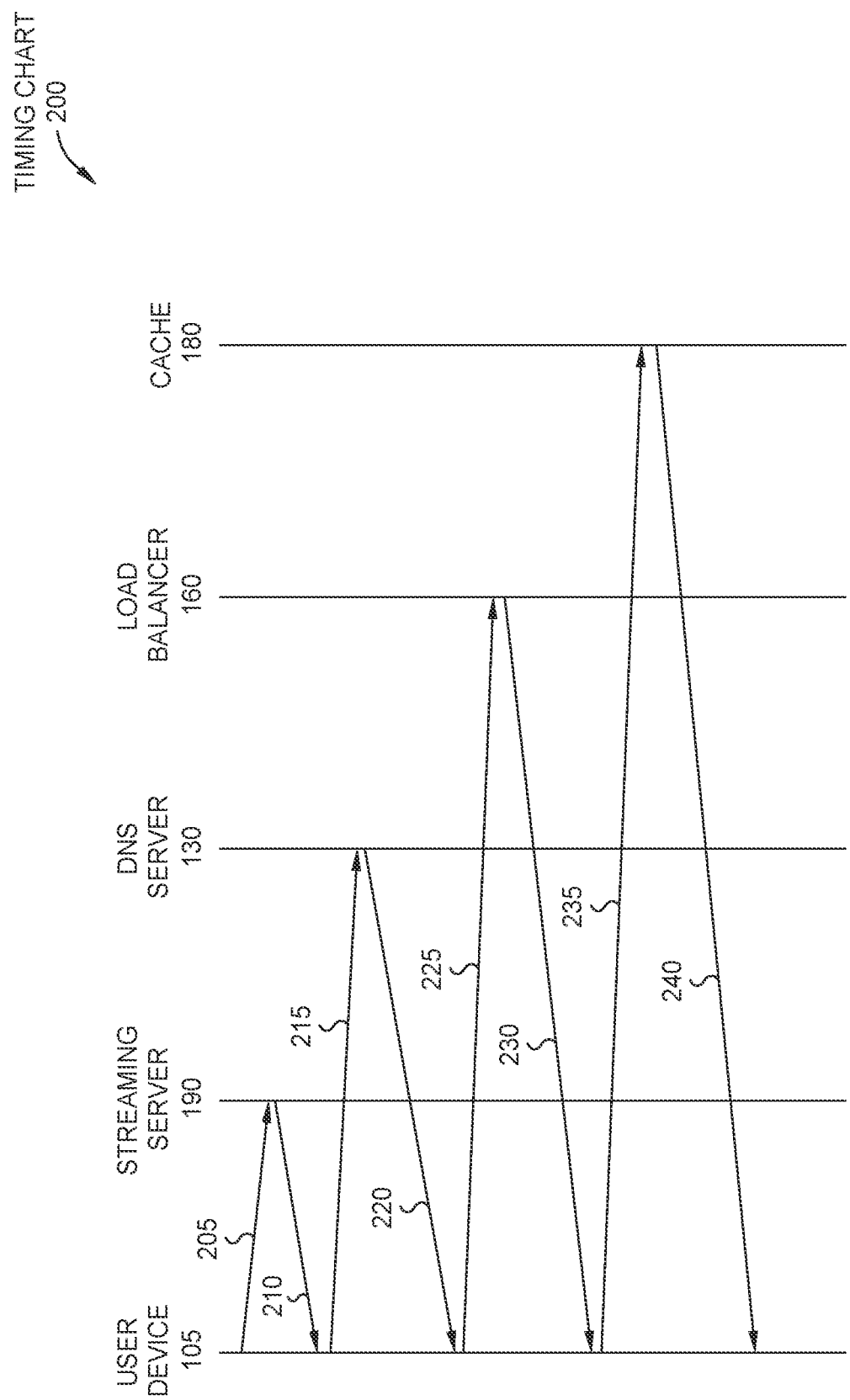
FIG. 2 is timing chart for retrieving an object from a CDN, according to one embodiment.

FIG. 2 is timing chart 200 for retrieving an object from a CDN, according to one embodiment. The timing chart 200 illustrates various communications between the user device 105 and the streaming server 190, DNS server 130, load balancer 160, and cache 180 in the CDN. Arrow 205 indicates the user device 105 making a selection of an object to retrieve or stream from the CDN. This selection is communicated to the streaming server 190. The user selection can be referred to as a service call to the streaming server 190. In response, arrow 210 illustrates the streaming server 190 providing a URL to the requested object (e.g., the object URL 195 in FIG. 1). The URL can include a name, description, or ID of the requested object.

To identify the IP address corresponding to the object URL, arrow 215 illustrates the user device 105 performing a DNS lookup using the DNS server 130. The user device 105 can use either a unicast connection or an anycast connection to select one of a plurality of DNS servers 130 associated with the CDN. For example, the user device 105 may already know which DNS server to use to perform the DNS lookup, in which case, can use a unicast connection. In contrast, the user device 105 can use an anycast connection so that the underlying network protocol automatically identifies the DNS server 130 with the shortest path to the user device 105. The embodiments herein are not limited to either situation.

Instead of the DNS server 130 providing the user device with an IP address to the cache 180 for retrieving the object, in this example, the DNS server 130 provides an anycast address for reaching one of the load balancers 160 used by the CDN as shown by the arrow 220 to the user device 105. In one embodiment, each of the load balancers 160 in the CDN corresponds to the same anycast IP address. The DNS servers 130 can be configured to respond to any DNS lookup for content in the CDN by providing the anycast IP address for the load balancers 160 to the user device 105.

Arrow 225 illustrates the user device 105 using the anycast IP address to perform anycast routing to automatically identify the load balancer 160 (and edge server) with the shortest path to the user device 105. That is, anycast routing uses the underlying routing protocol (e.g., BGP) in the network to identify the load balancer 160 of a plurality of load balancers with the shortest path in the network to the user device 105.

The load balancer 160 can then use one or more load balancing criteria to select the cache 180 from a plurality of caches in the CDN. Unlike a DNS lookup, when establishing the anycast connection the load balancer can receive the full path to the requested object as well as the true IP of the user. Thus, this information enables the load balancer 160 to perform a wider variety of load balancing strategies and perform a more accurate geolocation of the user device 105 than if the DNS server was tasked with selecting the cache.

Arrow 230 illustrates the load balancer 160 sending an HTTP redirect to the user device 105 to redirect the user device 105 to the selected cache 180. In one embodiment, the HTTP redirect closes or terminates the anycast connection between the user device 105 and the load balancer 160. Further, the HTTP redirect provides information so that the user device 105 can establish a unicast connection with the cache 180 as shown by arrow 235.

Arrow 240 illustrates the cache 180 using the unicast connection to transmit the requested object to the device 105. Because the connection between the user device 105 and the cache 180 is typically much longer in order to retrieve the object than the connection between the user device 105 and the load balancer 160, using a unicast connection between the user device 105 and the cache 180 avoids the susceptibility of an anycast connection to network disturbances. That is, if a network disturbance occurs along the unicast path between the user device 105 and the cache 180, the user device 105 will still connect to the same cache 180. Using an HTTP redirect to close or terminate the anycast connection with the load balancer 160 and establish a unicast connection to a selected cache 180 can avoid the risk of using a long anycast connection to retrieve or stream the requested object.

The timing chart 200 can be used to initialize a connection between the user device 105 and the cache 180 to retrieve or stream an object. While the timing chart 200 illustrates initializing an initial request to stream the object, the chart 200 can also be used to initialize an already started stream that, for whatever reason, was interrupted. For example, assume the user device 105 has already performed all the tasks shown in the timing chart 200 to begin streaming the object from the cache 180. However, the user device 105 may be a smart phone that has switched from using a cellular network to using a Wi-Fi network to stream. This switch may result in the user device 105 needing to reinitialize the stream. The user device 105 can then repeat the tasks represented by arrows 225-240 to reinitiate the stream. The tasks represented by arrows 205 and 220 do not need to be repeated since the user device 105 already knows the IP address for the object (i.e., the anycast IP address for the load balancer 160). Nonetheless, load balancing can be repeated to determine whether another cache 180 may be more suitable to stream the object given the user device is now using a different network. Or the previous cache 180 may be failed or went down for maintenance which caused the re-initialization. In any case, the user device 105 can again establish an anycast connection with the load balancer 160 (or a different load balancer 160) to identify the optimal cache 180 to use to restart the stream of the object. Thus, the embodiments herein can be used both when initializing a stream when first requesting the object as well as initializing a stream when a previous stream has been disrupted.

Figure 3:
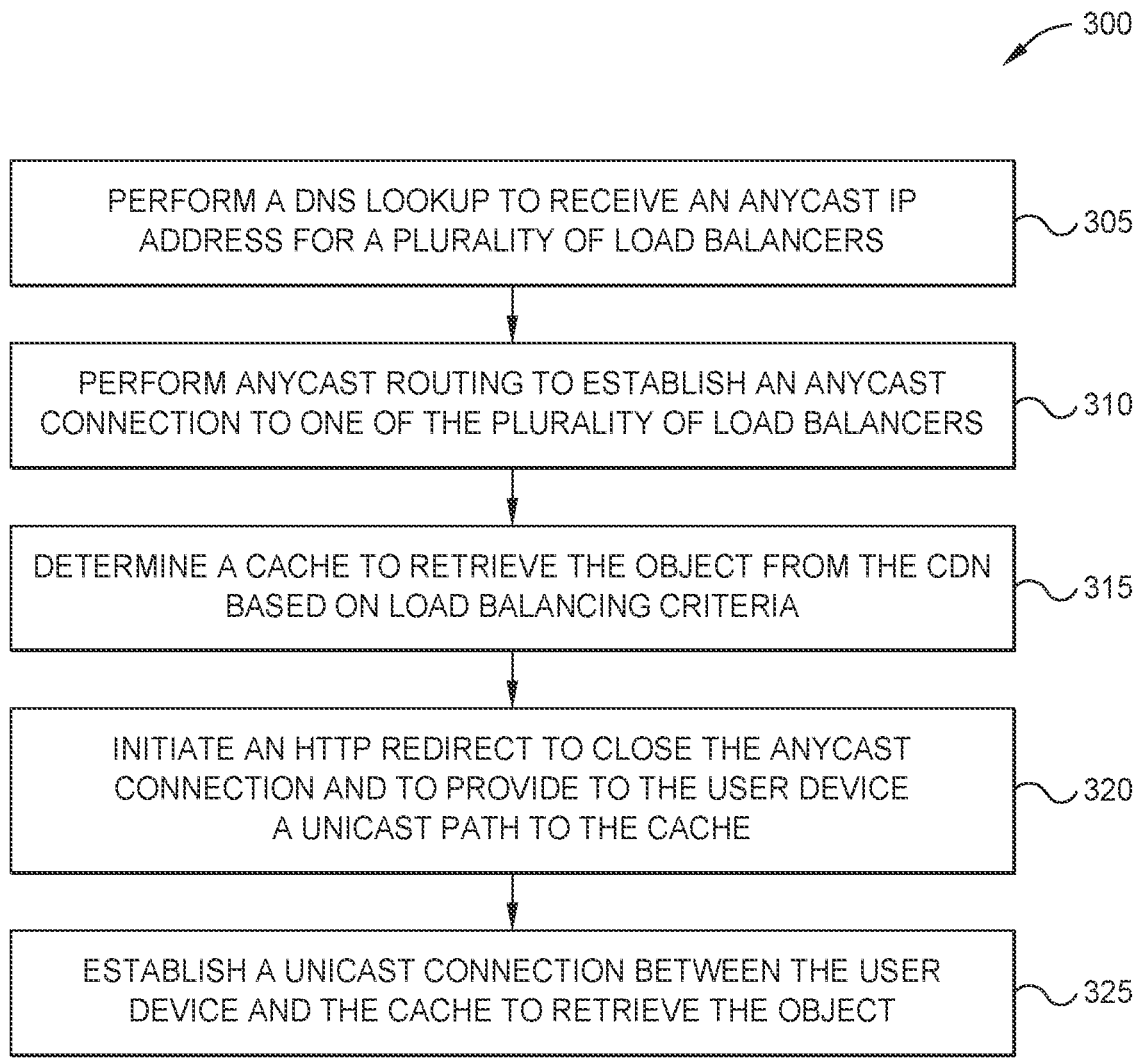
FIG. 3 is a flowchart for using anycast routing to identify a load balancer, according to one embodiment.

FIG. 3 is a flowchart of a method 300 for using anycast routing to identify a load balancer, according to one embodiment. The method 300 can begin in response to a user selecting an object to retrieve or stream from a CDN. At block 305, the user device performs a DNS lookup to receive an anycast IP address for a plurality of load balancers. That is, the load balancers share the same anycast IP address.

Block 305 can correspond to arrow 215 in FIG. 2 where the user device can use either a unicast connection or an anycast connection to select one of a plurality of DNS servers 130 associated with the CDN. For example, the user device may use a pre-selected DNS server to use to perform the DNS lookup using a unicast connection. In contrast, the user device can use an anycast connection to identify the DNS server with the shortest path to the user device.

At block 310, the user device performs anycast routing to establish an anycast connection to one of the plurality of load balancers corresponding to the CDN. That is, the user device can use the anycast IP address provided by the DNS server to perform anycast routing to identify the load balancer with the shortest path to the user device. The user device can use the anycast connection to provide the full path name of the object to the load balancer. Also, the load balancer can receive the true IP address of the user device so the balancer can perform geolocation services, if desired.

At block 315, the load balancer determines or selects a cache from a plurality of caches to retrieve the object from the CDN based on load balancing criteria. Non-limiting examples of load balancing criteria include using the cache to fulfill the request that is co-located with (or closest to) the load balancer, ensuring the load on any particular cache does not exceed a threshold, ensuring a minimum amount of requests are sent to each cache, routing requests away from a cache that will soon be taken down for maintenance, and the like. In another example, the load balancer can use the path name of the object to determine which CDN caches already have the object stored in their memory. However, the embodiments herein are not limited to any particular load balancing technique.

In one embodiment, load balancer can use non-standard signaling to indicate multiple caches for the user device to attempt to connect to retrieve the object. These caches may be ordered, weighted, or specify other specific retry policies. Thus, the load balancer may determine or select multiple caches from the plurality of caches.

At block 320, the load balancer initiates an HTTP redirect to close the anycast connection and provide the user device with a unicast path to the cache. As shown by the arrow 230 in FIG. 2, the load balancer can send the HTTP redirect to the user device to redirect the user device to the cache identified at block 315. In one embodiment, the HTTP redirect closes or terminates the anycast connection between the user device and the load balancer. Further, the HTTP redirect provides information (e.g., the unicast path) so that the user device can establish the unicast connection with the cache.

At block 325, the user device establishes a unicast connection with the cache to retrieve the object. In some embodiments, the unicast connection between the user device and the CDN cache is established much longer than the anycast connection between the user device and the load balancer at block 310. For example, the anycast connection may last between 100-300 milliseconds while the unicast connection can last for several seconds, if not longer, as the user device streams the content. Thus, using a unicast connection to stream the object from the cache avoids the susceptibly of an anycast connection to network disturbances which can cause the shortest path to switch to a different cache which forces the connection to reinitialize.

Figure 4:
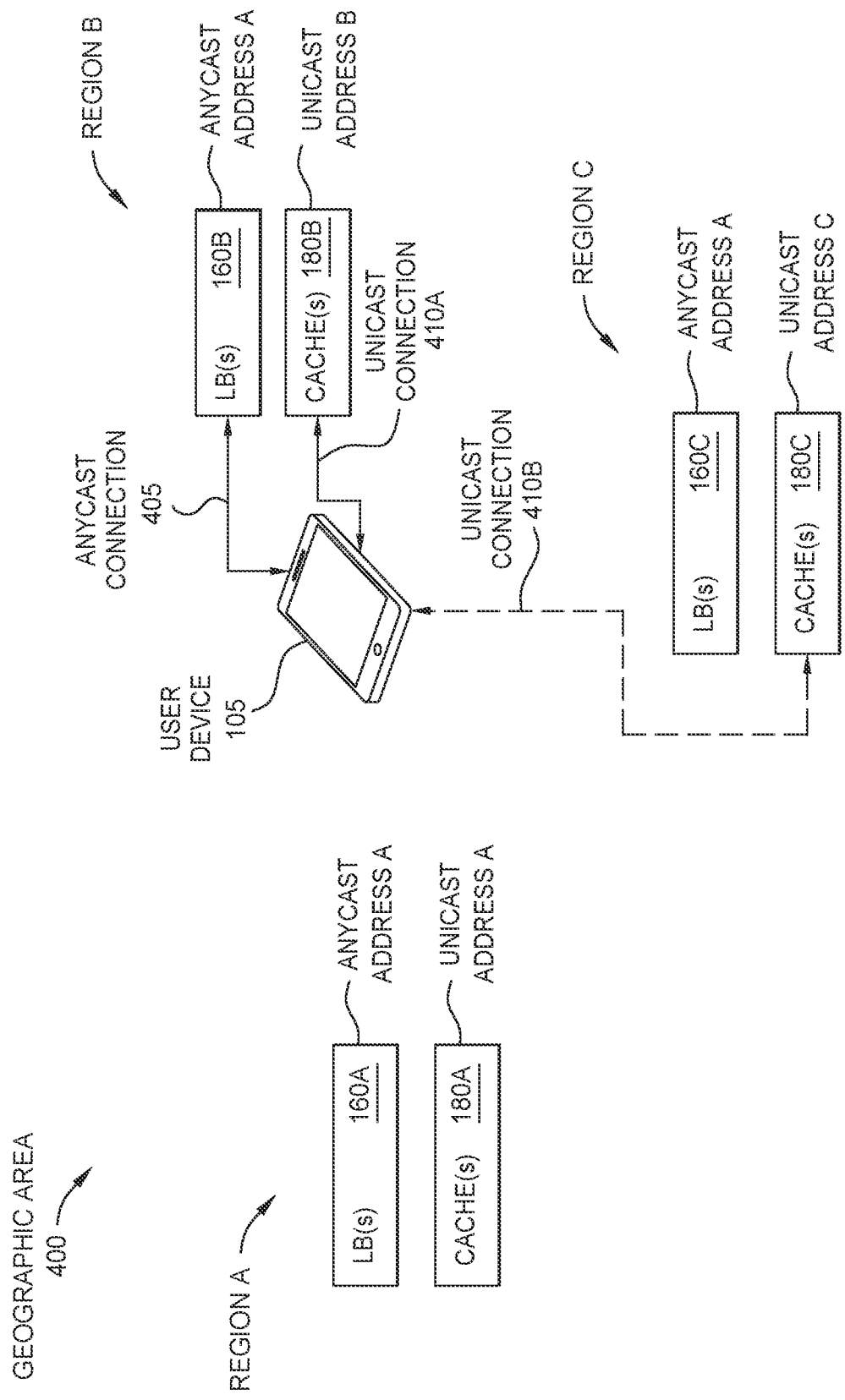
FIG. 4 illustrates a CDN with geographically distributed load balancers and caches, according to one embodiment.

FIG. 4 illustrates a CDN with geographically distributed load balancers and caches, according to one embodiment. In this example, the CDN is distributed in a geographic area 400 that includes Regions A, B, and C. Each geographic region includes on more load balancers (LBs) 160 and caches 180. For example, each region can have a different data center operated by the CDN in a different city, state, country, continent, etc. The LBs 160 and the caches 180 can be executed in those data centers. Regions with high population density or high demand can have multiple data centers and multiple LBs 160 and caches 180. In this example, the LBs 160 are co-located with the caches 180 in a particular region (e.g., hosted by the same data center).

FIG. 4 also illustrates the user device 105 which has used anycast routing to establish an anycast connection 405 with the LB 160B in Region B. That is, FIG. 4 illustrates a point in time where the user device 105 has already selected an object to retrieve from the CDN and received an anycast IP address from performing a DNS lookup (e.g., arrows 205-220 of FIG. 2 and block 305 of FIG. 3). As shown, all of the LBs 160 in FIG. 4 have the same anycast IP address—i.e., Anycast Address A. Thus, when performing anycast routing using Anycast Address A, the network automatically identified LB 160B as having the shortest path through the network to reach the user device 105. For example, the user device 105 may also be located in Region B. As such, the user device 105 establishes the anycast connection 405 with the LB 160B.

In this example, the LB 160B selects the cache 180B as the optimal cache for the user device 105 to retrieve or stream the requested object. For example, the LB 160B may default to selecting the cache 180B that is co-located with it as the optimal cache for the user device 105 since this cache 180B is also in the same region as the user device 105. In response, the LB 160B can send an HTTP redirect (not shown) to the user device 105 which terminates the anycast connection 405 and establishes a unicast connection 410A with the cache 180B. The user device 105 can retrieve the object from the cache 180B using the unicast connection 410A.

FIG. 4 also illustrates an alternative embodiment where the LB 160B can instead select the cache 180C in Region C as the optimal cache for the user device 105. Even though the user device is in Region B, the cache 180C may be the best cache to use for several reasons such as the cache 180B is about to go down for maintenance, is currently overloaded, or does not have the requested object. Thus, the LB 160B can instead send a HTTP redirect that establishes a unicast connection 410B with the cache 180C.

In another example, the LB 160B may initially select the cache 180B as the optimal cache to stream the object but may then change and select the cache 180C as the better choice. For example, in the middle of streaming the object from the cache 180B, the cache 180B may experience an error or malfunction that disrupts the unicast connection 410A. This may cause the user device 105 to repeat the initialization process by establishing the anycast connection 405 with the LB 160B. The LB 160B may have been notified of or detected the error in the cache 180B and instead selects the cache 180C as the new cache. The LB 160B can provide an HTTP redirect that causes the user device 105 to establish the unicast connection 410B with the cache 180C and resume the stream. Advantageously, the user device 105 can resume the stream using the cache 180C at the place the stream was interrupted using the cache 180B (assuming the caches 180B and 180C both have a copy of the requested object).

Figure 5:
FIG. 5 illustrates a load balancer using a HTTP redirect to provide a user device with a unicast path to a CDN cache, according to one embodiment.

FIG. 5 illustrates a load balancer 160 using a HTTP redirect to provide a user device with a unicast path to a CDN cache, according to one embodiment. As shown, the user device 105 can transmit an HTTP GET request 505 to perform anycast routing using an anycast IP address corresponding to the load balancer 160. After selecting the optimal cache for the user device to retrieve the object (e.g., the cache 180), the load balancer 160 can reply to the GET request 505 with an HTTP redirect 510. As discussed above, the HTTP redirect 510 can close the anycast connection and provide information for the user device 105 to establish a unicast connection with the cache 180. As shown, the HTTP redirect 510 includes a URL that includes a unicast path to the cache 180—i.e., http://<cache unicast>/path.

In response to the HTTP redirect 510, the user device 105 transmits an HTTP GET request 515 to the cache to establish the unicast connection. The user device 105 can then use this connection to retrieve the requested object from the cache 180.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
establishing an anycast connection between a load balancer associated with a content delivery network (CDN) and a user device requesting an object from the CDN, wherein the anycast connection is established using an anycast address identified via a lookup;

receiving, at the load balancer via the anycast connection, one or more identifiers that are not transmitted via the lookup;

selecting, at the load balancer and from a plurality of caches in the CDN, a first cache based on proximity to the user device, wherein the first cache is selected to fulfill the request for the object, wherein the first cache is selected based on one or more load balancing criteria and the one or more identifiers; and transmitting a Hypertext Transfer Protocol (HTTP) redirect from the load balancer to the user device to close the anycast connection, wherein the HTTP redirect comprises information for establishing a unicast connection between the user device and the first cache to retrieve the object from the first cache.

2. The method of claim 1, wherein the load balancer is one of a plurality of load balancers associated with the CDN, each of the plurality of load balancers having the anycast address.

3. The method of claim 2, wherein the plurality of load balancers and the plurality of caches are distributed in different geographic regions, wherein at least one of the plurality of load balancers and at least one of the plurality of caches are co-located in each of the geographic regions.

4. The method of claim 1, wherein the lookup comprises a domain name system (DNS) lookup.

5. The method of claim 2, wherein the load balancer has the shortest path of all the plurality of load balancers through a network to the user device.

6. The method of claim 5, wherein the anycast connection relies on an underlying routing protocol in the network to identify the shortest path.

7. The method of claim 1, wherein the HTTP redirect comprises an HTTP response status code 302.

8. The method of claim 1, the one or more identifiers comprising:

a full path to the object and an Internet Protocol (IP) address of the user device.

9. A non-transitory computer-readable medium containing computer program code that, when executed by operation of one or more computer processors, performs an operation comprising:

establishing an anycast connection between a load balancer associated with a content delivery network (CDN) and a user device requesting an object from the CDN, wherein the anycast connection is established using an anycast address identified via a lookup;

receiving, at the load balancer via the anycast connection, one or more identifiers that are not transmitted via the lookup;

selecting, at the load balancer and from a plurality of caches in the CDN, a first cache based on proximity to the user device, wherein the first cache is selected to fulfill the request for the object, wherein the first cache is selected based on one or more load balancing criteria and the one or more identifiers; and transmitting a Hypertext Transfer Protocol (HTTP) redirect from the load balancer to the user device to close the anycast connection, wherein the HTTP redirect comprises information for establishing a unicast connection between the user device and the first cache to retrieve the object from the first cache.

10. The non-transitory computer-readable medium of claim 9, wherein the load balancer is one of a plurality of load balancers associated with the CDN, each of the plurality of load balancers having the anycast address.

11. The non-transitory computer-readable medium of claim 10, wherein the plurality of load balancers and the plurality of caches are distributed in different geographic regions, wherein at least one of the plurality of load balancers and at least one of the plurality of caches are co-located in each of the geographic regions.

12. The non-transitory computer-readable medium of claim 9, wherein the lookup comprises a domain name system (DNS) lookup.

13. The non-transitory computer-readable medium of claim 10, wherein the load balancer has the shortest path of all the plurality of load balancers through a network to the user device.

14. The non-transitory computer-readable medium of claim 9, wherein the HTTP redirect comprises an HTTP response status code 302.

15. A server, comprising:

a processor;

memory storing computer program code that, when executed by operation of the processor, performs an operation comprising:

establishing an anycast connection between the server and a user device requesting an object from a content delivery network (CDN), wherein the anycast connection is established using an anycast address identified via a lookup;

receiving, via the anycast connection, one or more identifiers that are not transmitted via the lookup;

selecting, from a plurality of caches in the CDN, a first cache based on proximity to the user device, wherein the first cache is selected to fulfill the request for the object, wherein the first cache is selected based on one or more load balancing criteria and the one or more identifiers; and transmitting a Hypertext Transfer Protocol (HTTP) redirect to the user device to close the anycast connection, wherein the HTTP redirect comprises information for establishing a unicast connection between the user device and the first cache to retrieve the object from the first cache.

16. The server of claim 15, wherein the server is one of a plurality of servers associated with the CDN, each of the plurality of servers having the anycast address.

17. The server of claim 16, wherein the plurality of servers and the plurality of caches are distributed in different geographic regions, wherein at least one of the plurality of server and at least one of the plurality of caches are co-located in each of the geographic regions.

18. The server of claim 15, wherein the lookup comprises a domain name system (DNS) lookup.

19. The server of claim 16, wherein the server has the shortest path of all the plurality of server through a network to the user device.

20. The server of claim 15, wherein the HTTP redirect comprises an HTTP response status code 302.

21. The server of claim 15, wherein the server comprises a load balancer.

22. The method of claim 1, the one or more identifiers comprising at least one of an identifier of the user device and an identifier of the object, the identifier of the user device comprising an Internet Protocol (IP) address of the user device, the identifier of the object comprising a pathname of the object;

wherein the first cache is selected based on the one or more identifiers to improve a measure of accuracy in cache selection, wherein the first cache is selected based on the IP address of the user device and the pathname of the object;

wherein the retrieved object is transmitted via the unicast connection in lieu of the anycast connection to avoid a network disturbance characteristic of anycast routing, the network disturbance characterized by a network condition causing a load-balancer change in anycast routing;

wherein the proximity is determined based on geographical distance and network distance;

wherein the lookup comprises a Domain Name System (DNS) lookup initiated by the user device.

* * * * *